(12) United States Patent
Murata (10) Patent No.: US 11,016,552 B2
(45) Date of Patent: May 25, 2021

(54) IMAGE FORMING APPARATUS

(71) Applicant: KYOCERA Document Solutions Inc., Osaka (JP)

(72) Inventor: Koji Murata, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 56 days.

(21) Appl. No.: 16/258,772

(22) Filed: Jan. 28, 2019

(65) Prior Publication Data

US 2019/0235603 A1 Aug. 1, 2019

(30) Foreign Application Priority Data

Jan. 30, 2018 (JP) .............................. JP2018-013763

(51) Int. Cl.
| | | |
|---|---|---|
| *G06F 1/3231* | (2019.01) | |
| *G01J 5/34* | (2006.01) | |
| *G03G 15/00* | (2006.01) | |
| *H04N 1/00* | (2006.01) | |

(52) U.S. Cl.
CPC .............. *G06F 1/3231* (2013.01); *G01J 5/34* (2013.01); *G03G 15/5016* (2013.01); *G03G 15/5091* (2013.01); *H04N 1/00411* (2013.01); *G03G 15/5004* (2013.01); *H04N 1/00896* (2013.01); *H04N 2201/0094* (2013.01)

(58) Field of Classification Search
CPC . G06F 1/26; G06F 1/32; G06F 1/3203; G06F 1/3206; G06F 1/3231; G06F 3/002; G06F 3/01; G06F 3/011; G06F 3/017; G01J 5/34; G03G 15/50; G03G 15/5004; G03G 15/5008; G03G 15/5016; G03G 15/5091; H04N 1/00127; H04N 1/00209; H04N 1/00236; H04N 1/0035; H04N 1/00381; H04N 1/00835; H04N 1/00885; H04N 1/00888; H04N 1/00891; H04N 2201/0098; H04N 2201/02404; H04N 2201/02406; H04N 2201/02416; H04N 2201/02427; H04N 2201/02431; H04N 2201/02437; H04N 2201/32

See application file for complete search history.

(56) References Cited

U.S. PATENT DOCUMENTS

| | | | | |
|---|---|---|---|---|
| 2,990,758 A | * | 7/1961 | Sauer ........................ | G03B 7/06 396/147 |
| 3,063,336 A | * | 11/1962 | Winkler ................ | G01J 1/4214 356/227 |
| 3,063,352 A | * | 11/1962 | Engelsmann ............ | G03B 7/12 396/215 |

(Continued)

FOREIGN PATENT DOCUMENTS

JP 2017-21205 A 1/2017

*Primary Examiner* — Anastasia Midkiff
(74) *Attorney, Agent, or Firm* — IP Business Solutions, LLC (57) ABSTRACT

To provide an image forming apparatus whose detection range of a person by using a pyroelectric sensor is adjustable without adjusting sensitivity of the pyroelectric sensor, an image forming apparatus includes: an image forming apparatus main body; and a pyroelectric sensor that detects presence of a person based on light received from the periphery of the image forming apparatus main body, wherein the pyroelectric sensor is rotatably mounted to the image forming apparatus main body.

6 Claims, 9 Drawing Sheets

(56) References Cited

U.S. PATENT DOCUMENTS

| | | | |
|---|---|---|---|
| 2011/0303775 A1* | 12/2011 | Kim | B02C 18/0007 |
| | | | 241/34 |
| 2012/0292510 A1* | 11/2012 | Tanaka | G01V 9/005 |
| | | | 250/338.3 |
| 2014/0098394 A1* | 4/2014 | Tanisaki | H04N 1/00323 |
| | | | 358/1.13 |
| 2015/0055158 A1* | 2/2015 | Ogata | H04N 1/0035 |
| | | | 358/1.13 |
| 2016/0241732 A1* | 8/2016 | Utoh | H04N 1/00896 |
| 2017/0257519 A1* | 9/2017 | Kuroishi | H04N 1/333 |

* cited by examiner

IMAGE FORMING APPARATUS

INCORPORATION BY REFERENCE

This application is based upon, and claims the benefit of priority from, corresponding Japanese Patent Application No. 2018-013763 filed in the Japan Patent Office on Jan. 30, 2018, the entire contents of which are incorporated herein by reference.

BACKGROUND

1. Field of the Invention

The present disclosure relates to an image forming apparatus that detects a person by using a pyroelectric sensor.

2. Description of Related Art

Pyroelectric sensors (pyroelectric elements) are used to detect an approach of a person to an image forming apparatus.

SUMMARY

An image forming apparatus according to the present disclosure includes an image forming apparatus main body and a pyroelectric sensor that detects presence of a person based on light received from a periphery of the image forming apparatus main body. The pyroelectric sensor is rotatably mounted to the image forming apparatus main body.

DETAILED DESCRIPTION

Hereinafter, detail explanation is given of embodiments of the present disclosure with reference to the drawings. Note that the present disclosure is not limited to the following embodiments.

Figure 1:
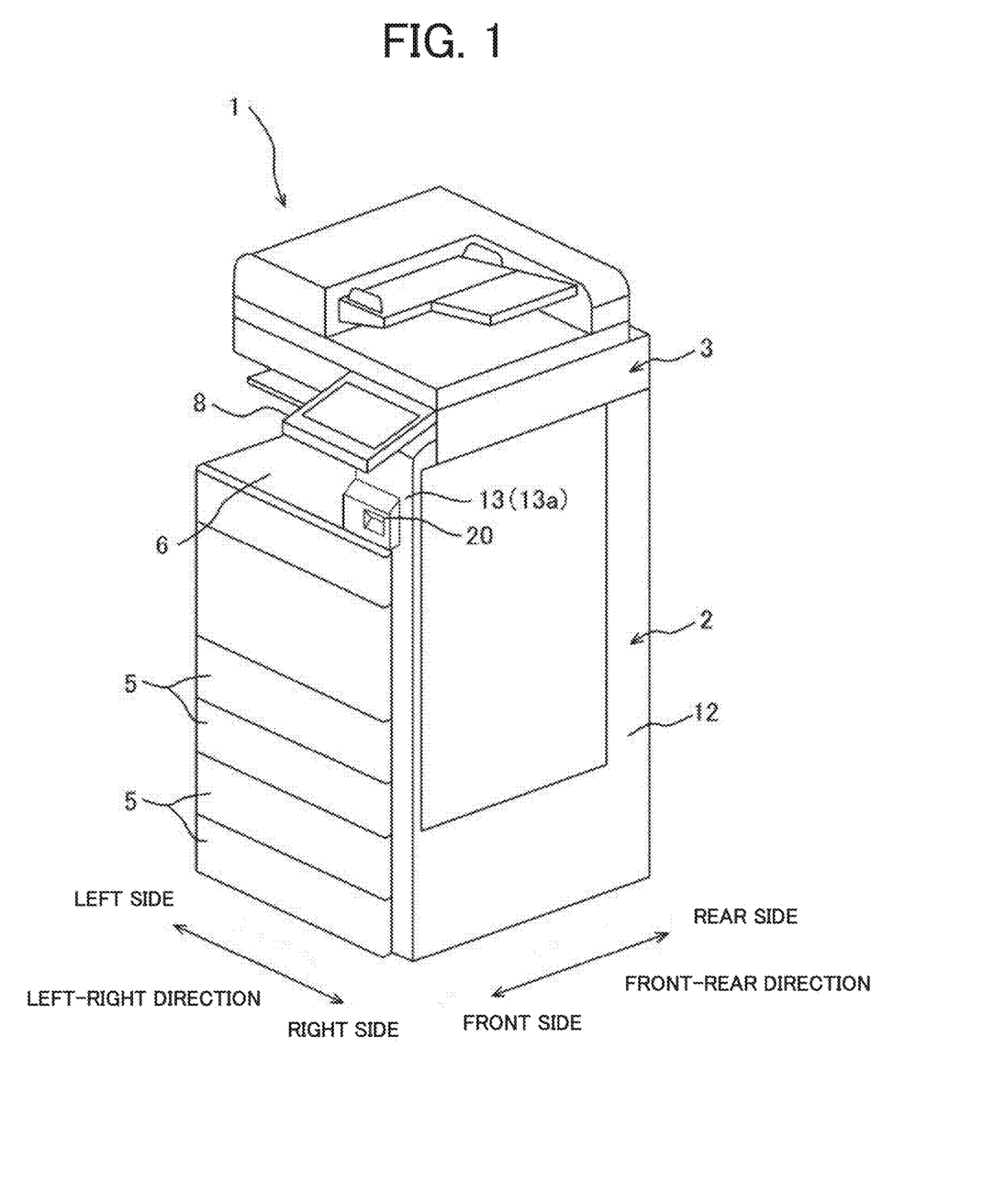
FIG. 1 is a perspective view illustrating a schematic configuration of an image forming apparatus according to an embodiment.

FIG. 1 is a schematic configuration diagram of an image forming apparatus 1 according to an embodiment. The image forming apparatus 1 is a complex image forming apparatus (i.e., multifunction peripheral) having a scanner function, a facsimile function, and a copy function in addition to a print function. Note that, in the following explanation, the front side and the rear side mean the front side and the rear side of the image forming apparatus 1, and the left side and the right side mean the left side and the right side of the image forming apparatus 1 when being viewed from the front side.

As illustrated in FIG. 1, the image forming apparatus 1 includes: an image forming apparatus main body 2; and an image reading device 3 arranged on the upper side of the image forming apparatus main body 2. The image forming apparatus main body 2 includes: an image forming unit (not illustrated) that transfers and forms an image on a recording sheet, based on image data; a main body casing 12 that accommodates the image forming unit; and a connection casing 13 arranged at an upper right position of the image forming apparatus main body 2 to connect the main body casing 12 and the image reading device 3. Between the main body casing 12 and the image reading device 3, there is provided an in-body sheet-discharging space 6 which is open on the left side and the front side. The right side of the in-body sheet-discharging space 6 is partitioned by the left surface of the connection casing 13. At a position on the right-hand side of the front side of the image reading device 3, there is provided an operation panel 8.

In an upper portion of the main body casing 12, there are accommodated the above-described image forming unit and a toner container (not illustrated) that stores toner to be supplied to the image forming unit. In a lower portion of the main body casing 12, there are provided multiple sheet-feeding cassettes 5. The image forming unit performs printing on a sheet fed from a sheet-feeding cassette 5, based on specific image data. An electrophotographic method is adopted as a printing method in the image forming unit. That is, the image forming unit forms an electrostatic latent image by irradiating the surface of a photosensitive drum with laser light corresponding to the image data, then develops the electrostatic latent image with toner, and transfers the developed image onto the sheet.

In the present embodiment, a human detection unit 20 is provided in the front surface of the connection casing 13. The human detection unit 20 is a unit for detecting that a person (i.e., user, etc.) has approached the image forming apparatus 1. The human detection unit 20 is provided at a right-hand side position of the image forming apparatus 1 as with the operation panel 8. The human detection unit 20 is located within the range where the operation panel 8 is disposed in terms of the left-right direction of the image forming apparatus 1. In addition, the human detection unit 20 is disposed, for example, above the center of the image forming apparatus main body 2 and below the operation panel 8 in terms of the vertical direction of the image forming apparatus 1. Noted that the image forming apparatus 1 includes a control unit (not illustrated) that switches from a normal state (i.e., printable state) to a standby state (i.e., power-saving state) when the unused time exceeds a specific period of time and switches back to the normal state in a case where presence of a person is detected by the human detection unit 20 in the standby state.

Configuration of Human Detection Unit

An explanation is given of the human detection unit 20 with reference to FIGS. 2 through 9.

Figure 2:
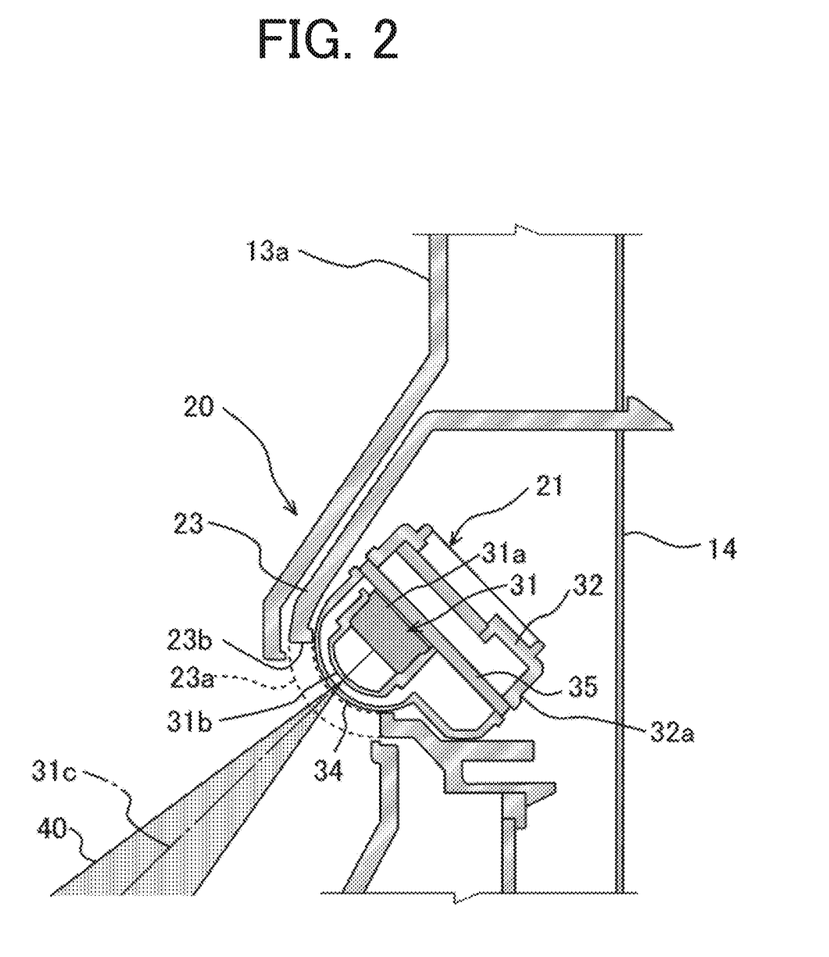
FIG. 2 is a cross-sectional view of a human detection unit provided in the image forming apparatus according to the embodiment.
Figure 3:
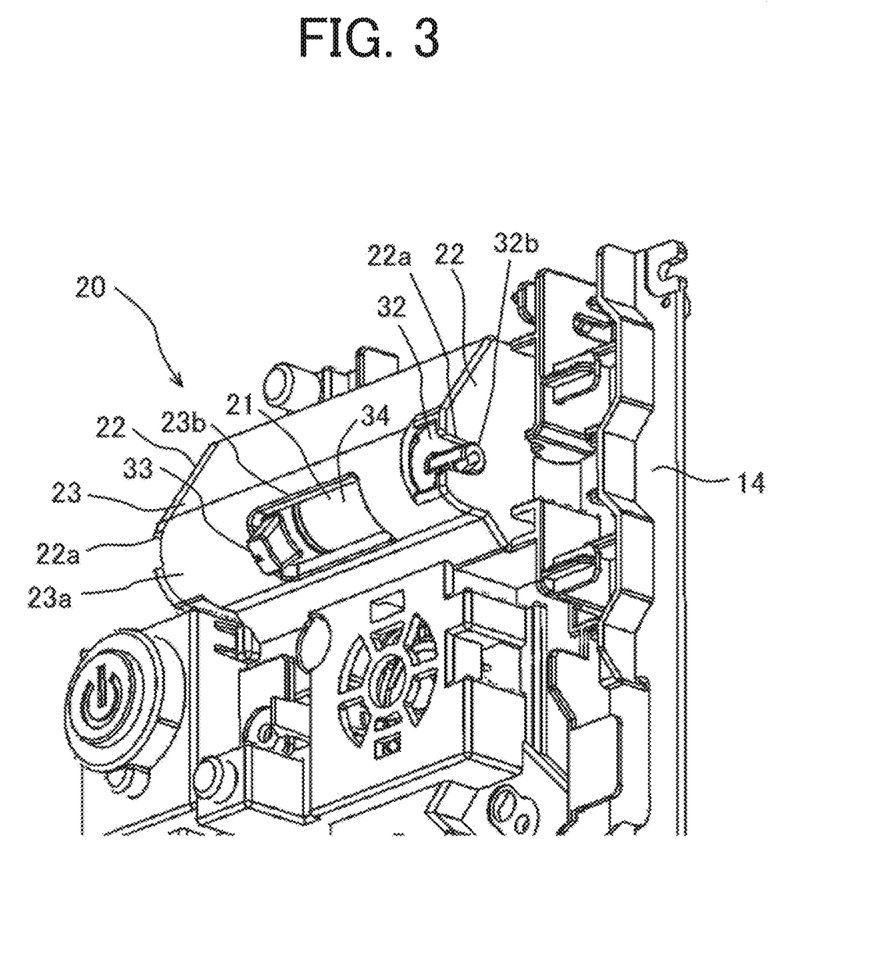
FIG. 3 is a perspective view of the human detection unit of the image forming apparatus according to the embodiment, a front cover of a connection casing being removed therefrom.

FIG. 2 is a cross-sectional view of the human detection unit 20. FIG. 3 is a perspective view of the human detection unit 20 in a state where the front cover 13a of the connection casing 13 is removed. In this state, the plate-shape inner support member 14 which is disposed inside the connection casing 13 and is integrated with the connection casing 13 is exposed.

In the human detection unit 20, as illustrated in FIGS. 2 and 3, a part of the front cover 13a of the connection casing 13 is disposed in a recess 13b formed on a surface projecting forward from the front surface. The human detection unit 20 includes: a sensor unit 21; a pair of supporting members 22 that support the sensor unit 21 to be rotatable; and a sensor cover 23 that covers the front side of the sensor unit 21. The pair of support members 22 are fixed to the front surface of the inner support member 14 and disposed at the same height with a space therebetween in the left-right direction. Each support member 22 is projecting forward from the inner support member 14 and has a notch 22a formed from the front side, into which the later-described shaft member 32b is fitted.

The sensor unit 21 includes: a pyroelectric sensor 31; a rotation member 32 to which the pyroelectric sensor 31 is fixed and which is rotatably provided in the image forming apparatus main body 2; and an operation lever (i.e., operation unit) 33 used by a user to rotate the pyroelectric sensor 31. The rotation member 32 is rotatable on a rotation axis extending in the left-right direction of the image forming apparatus 1.

The pyroelectric sensor 31 is a sensor for detecting presence of a person, based on light received from the periphery of the image forming apparatus 1. Specifically, the pyroelectric sensor 31 detects infrared rays of a specific wavelength emitted from human bodies by using the pyroelectric effect. The pyroelectric sensor 31 is mounted on the front surface of a substrate 35, which is attached to the rotation member 32. As illustrated in FIG. 2, the pyroelectric sensor 31 includes: a light receiving element 31a that receives incident light (i.e., infrared rays); and a hemispherical lens member 31b that coverts the front-surface side of the light receiving element 31a. The optical axis 31c of the pyroelectric sensor 31 extends perpendicularly from the center of the front surface (i.e., light receiving surface) of the light receiving element 31a. In the pyroelectric sensor 31, the light receiving range 40 in which infrared rays can be detected spreads from the pyroelectric sensor 31 in a conical shape whose center is the optical axis 31c. The pyroelectric sensor 31 detects infrared rays emitted from a human body within the light receiving range 40 and does not detect infrared rays emitted from a human body outside the light receiving range 40. The pyroelectric sensor 31 outputs a detection signal as a notification that a person is detected to the above-described control unit in a case of detecting an infrared ray of a specific wavelength.

Figure 4:
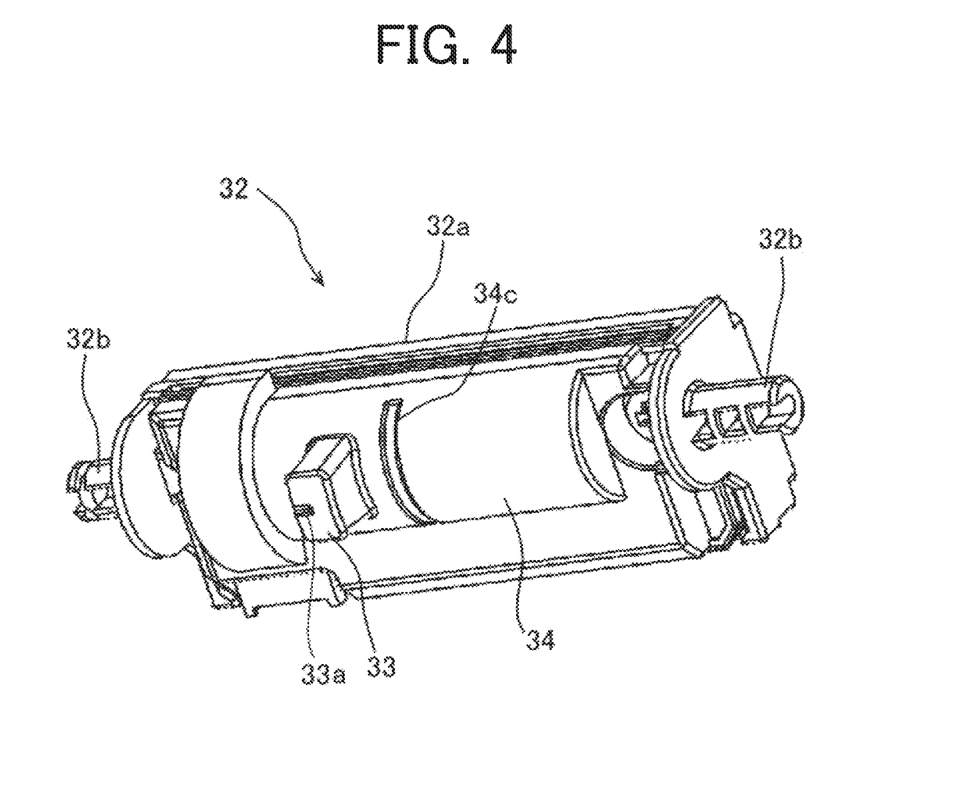
FIG. 4 is a perspective view of a rotation member of the human detection unit according to the embodiment.

FIG. 4 is a perspective view of the rotation member 32. As illustrated in FIG. 4, the rotation member 32 includes: a substrate supporting part 32a having a rectangular shape in a front view; and a pair of shaft members 32b integrated with the substrate supporting part 32a. The above-described substrate 35 is attached to the front side of the substrate supporting part 32a. The pyroelectric sensor 31 and a hemispherical attachment plate 34, to which the operation lever 33 is fixed, are attached to the substrate supporting part 32a via the substrate 35. The operation lever 33 is projecting from the front surface of the attachment plate 34. A reference line 33a is formed as a linear projection on an end surface of the operation lever 33. The reference line 33a is formed on the optical axis 31c of the pyroelectric sensor 31. The reference line 33a is a mark indicating a position of the optical axis 31c. The attachment plate 34 is provided so as to cover the front-surface side of the substrate 35, and a slit 34c is formed at a position faced by the pyroelectric sensor 31.

The pair of shaft members 32b are coaxial with each other and provided in the left and right sides of the substrate supporting part 32a. Each shaft member 32b is fitted into a notch 22a of each supporting member 22. In this state, the axis of each shaft member 32b extends in the left-right direction of the image forming apparatus 1. This axis approximately passes through the center of the light receiving surface of the light receiving element 31a of the pyroelectric sensor 31. Further, a ring member (not illustrated) is attached to each shaft member 32b as a detachment stopper so as to prevent the shaft member 32b from slipping off the notch 22a. Accordingly, the rotation member 32 is supported by the pair of supporting members 22 to be rotatable so that the direction of the optical axis 31c of the pyroelectric sensor 31 changes in the vertical direction. When a user operates the operation lever 33 upward or downward, the sensor unit 21 provided with the pyroelectric sensor 31 and the rotation member 32 can be rotated.

The sensor cover 23 is attached to the inner support member 14 at a position between the pair of support members 22. The sensor cover 23 is a plate-shape member that curves so as to project forward from the inner support member 14 and covers the sensor unit 21 disposed inside the sensor cover 23. In a cross-sectional view, the lower portion 23a of the sensor cover 23 is formed in an arc shape (i.e., an arc shape of approximately 90 degrees) whose center is positioned near the axis of the shaft members 32b.

The lower portion 23a of the sensor cover 23 is directed obliquely forward and downward from the image forming apparatus 1. In the lower portion 23a, at a position corresponding to the pyroelectric sensor 31, there is formed a window 23b in a substantially rectangular shape. The operation lever 33 provided in the left side of the pyroelectric sensor 31 is protruding to the outside through the window 23b.

The height of the window 23b is longer than the length of the longitudinal side of the operation lever 33 viewed in the projecting direction. Therefore, the operation lever 33 can be rotated within a range from the rotation angle where the operation lever 33 hits the upper edge of the window 23b to the rotation angle where the operation lever 33 hits the lower edge of the window 23b. The rotatable range of the operation lever 33 defines the rotatable range of the sensor unit 21 and defines the adjustable range of the direction of the optical axis 31c of the pyroelectric sensor 31 in the vertical direction. The adjustable range of the direction of the optical axis 31c of the pyroelectric sensor 31 in the vertical direction is limited by the window 23b to a specific range directed diagonally downward.

An opening 13c corresponding to the window 23b is formed in the front cover 13a. A tip end portion of the operation lever 33 protrudes from the opening 13c. Two scale lines 13d, which are linear protrusions, are formed parallel to each other at predetermined intervals in the vertical direction at an edge of the opening 13c adjacent to the operation lever 33. When the scale line 13d is rotated to a position to abut an upper edge of the window 23b, the reference line 33a is positioned on an upper one of the scale lines 13d and, when the scale line 13d is rotated to a position to abut a lower edge of the window 23b, the reference line 33a is positioned on a lower one of the scale lines 13d.

Note that rotation angles of the sensor unit 21 can be held by the frictional force. That is, the sensor unit 21 is not rotated by a small force and therefore the direction of the optical axis 31c of the pyroelectric sensor 31 does not change. The direction of the optical axis 31c of the pyroelectric sensor 31 can be fixed in a desired direction within the limited range. The direction of the optical axis 31c of the pyroelectric sensor 31 is easily adjustable to a predetermined direction based on the position of the reference line 33a and the scale line 33d. Further, for example, there may be multiple protrusions (e.g., protrusions made of resin) provided in the outer circumferential surface of the sensor unit 21 and an engagement part provided in the inner surface of the sensor cover 23, etc., which gets caught on each of the protrusions, so that the sensor unit 21 is locked at multiple rotary positions. In this case, the direction of the optical axis 31c of the pyroelectric sensor 31 can be adjusted in multiple levels (e.g., three levels).

Detection Range by Human Detection Unit

Figure 5:
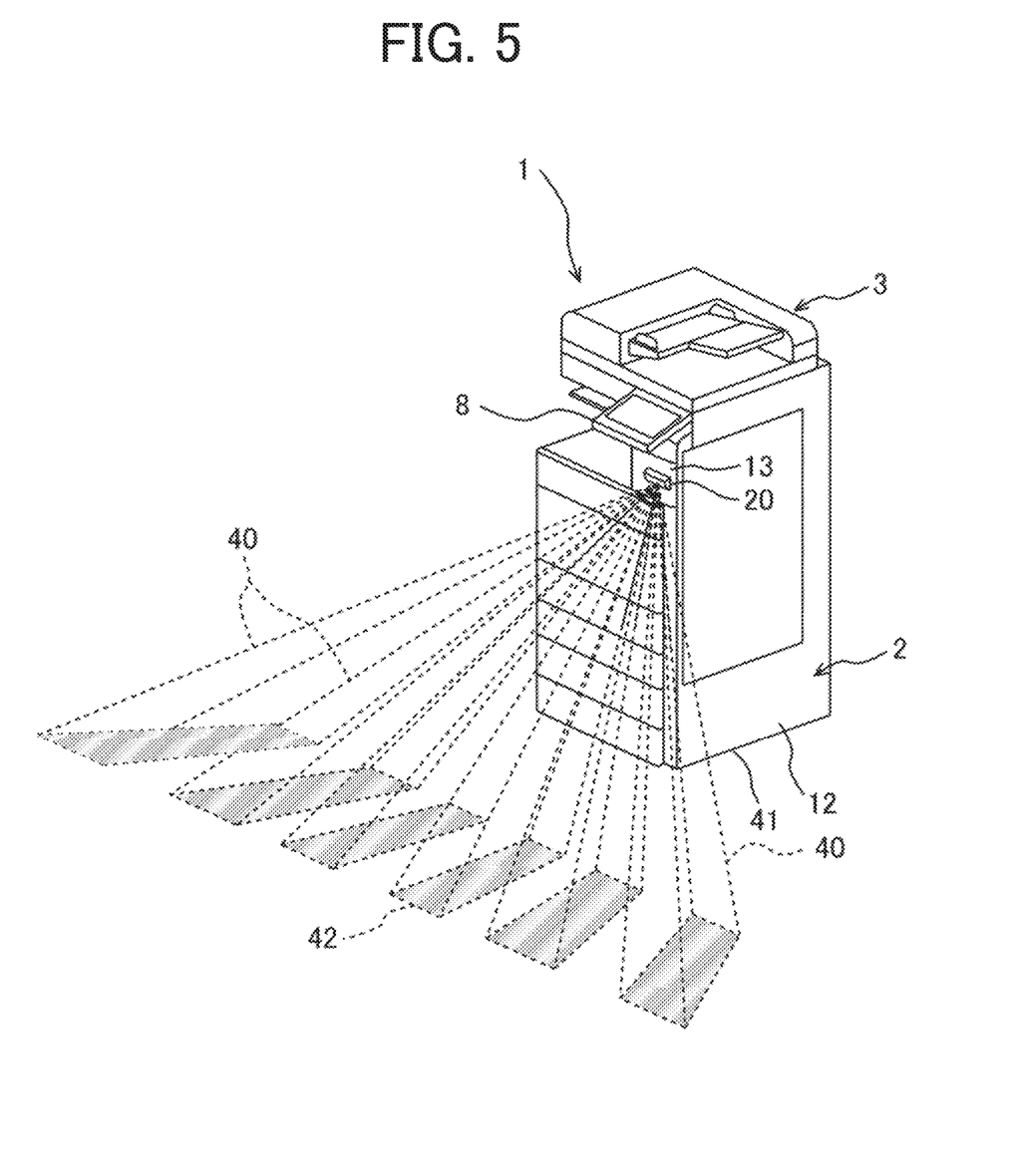
FIG. 5 is a perspective view for explaining a detection range of a pyroelectric sensor in the image forming apparatus according to the embodiment.

FIG. 5 is a perspective view for explaining the detection range of the pyroelectric sensor 31 of the image forming apparatus 1. As illustrated in FIG. 5, the pyroelectric sensor 31 has light receiving ranges 40 serially arranged in the left-right direction whose center is in front of the image forming apparatus 1. Further, the interval of the light receiving ranges in the left-right direction is relatively narrow so as not to fail to detect a person who is approaching the image forming apparatus 1. Note that, in the present embodiment, the output amplification factor of the pyroelectric sensor 31 is set to a relatively great value, so that the pyroelectric sensor 31 can accurately detect presence or absence of a person in the light receiving ranges 40. For example, sensitivity of the pyroelectric sensor 31 is high enough to be able to detect infrared rays emitted from a human body existing at a position twice or more as far as a detectable distance L (described later) determined based on the light receiving ranges 40 (e.g., a position 5 meters away from the pyroelectric sensor 31).

Figure 6:
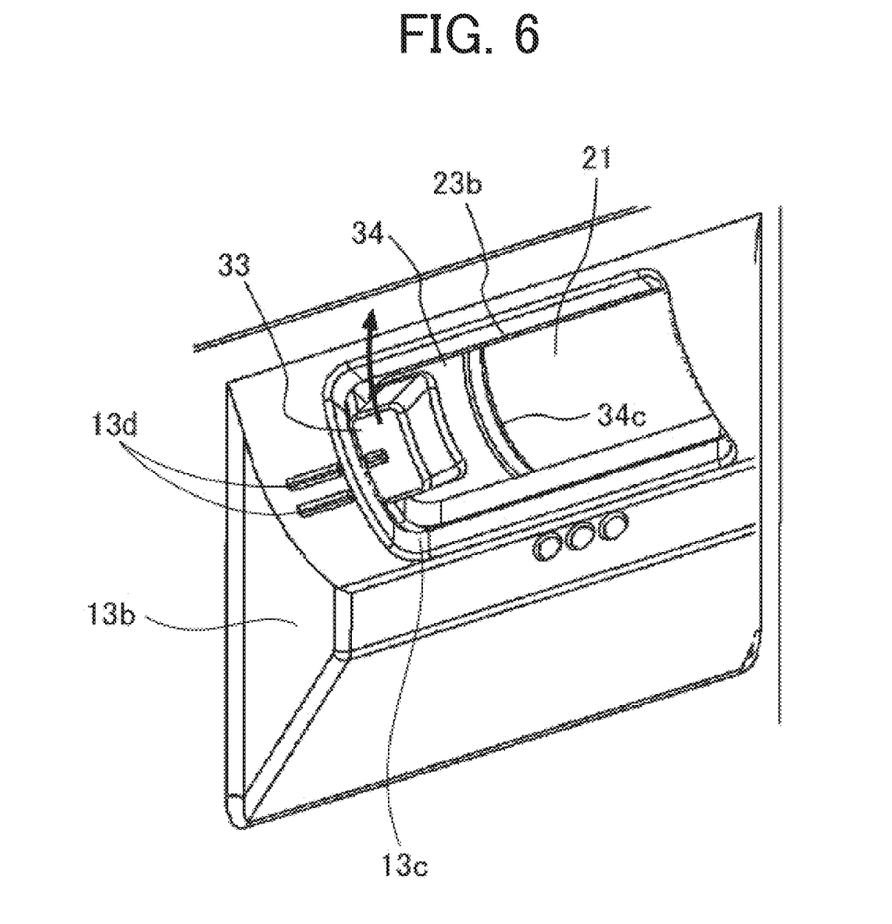
FIG. 6 is an enlarged perspective view of the human detection unit of the image forming apparatus according to the embodiment, an operation lever being operated upward.
Figure 7:
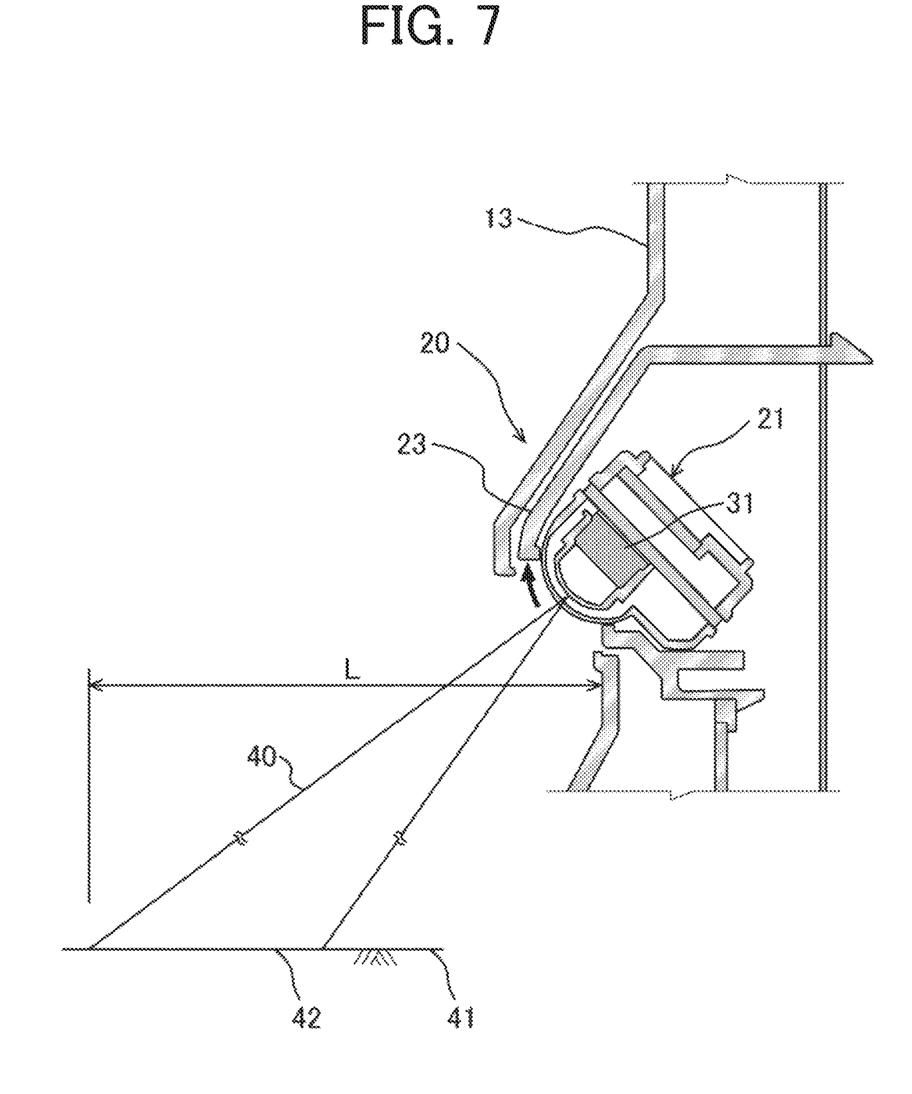
FIG. 7 is a cross-sectional view illustrating the detection range of the pyroelectric sensor in the human detection unit of the image forming apparatus according to the embodiment with the operation lever being operated upward.

As illustrated in FIGS. 6 and 7, when the operation lever 33 is rotated upward (i.e., toward the front side), the direction of the optical axis 31c of the pyroelectric sensor 31 becomes closer to the horizontal direction. In addition, on the installation surface 41 where the image forming apparatus 1 is installed, the areas 42 that are in the light receiving ranges 40 of the pyroelectric sensor 31 become farther from the image forming apparatus 1. The first state where the operation lever 33 hits the upper edge of the window 23b is a state where the areas 42 are furthest, in which the distance L where the pyroelectric sensor 31a can detect a person is longest (e.g., 1.2 m). The distance L is the horizontal distance from the front surface of the image forming apparatus 1.

Figure 8:
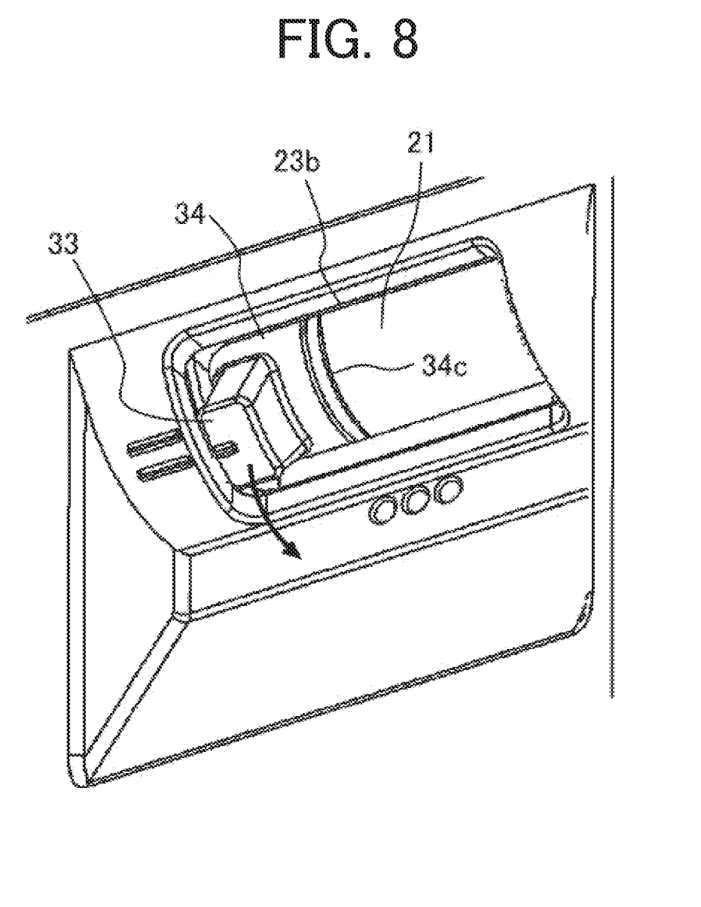
FIG. 8 is an enlarged perspective view illustrating the human detection unit of the image forming apparatus according to the embodiment with the operation lever being operated downward.
Figure 9:
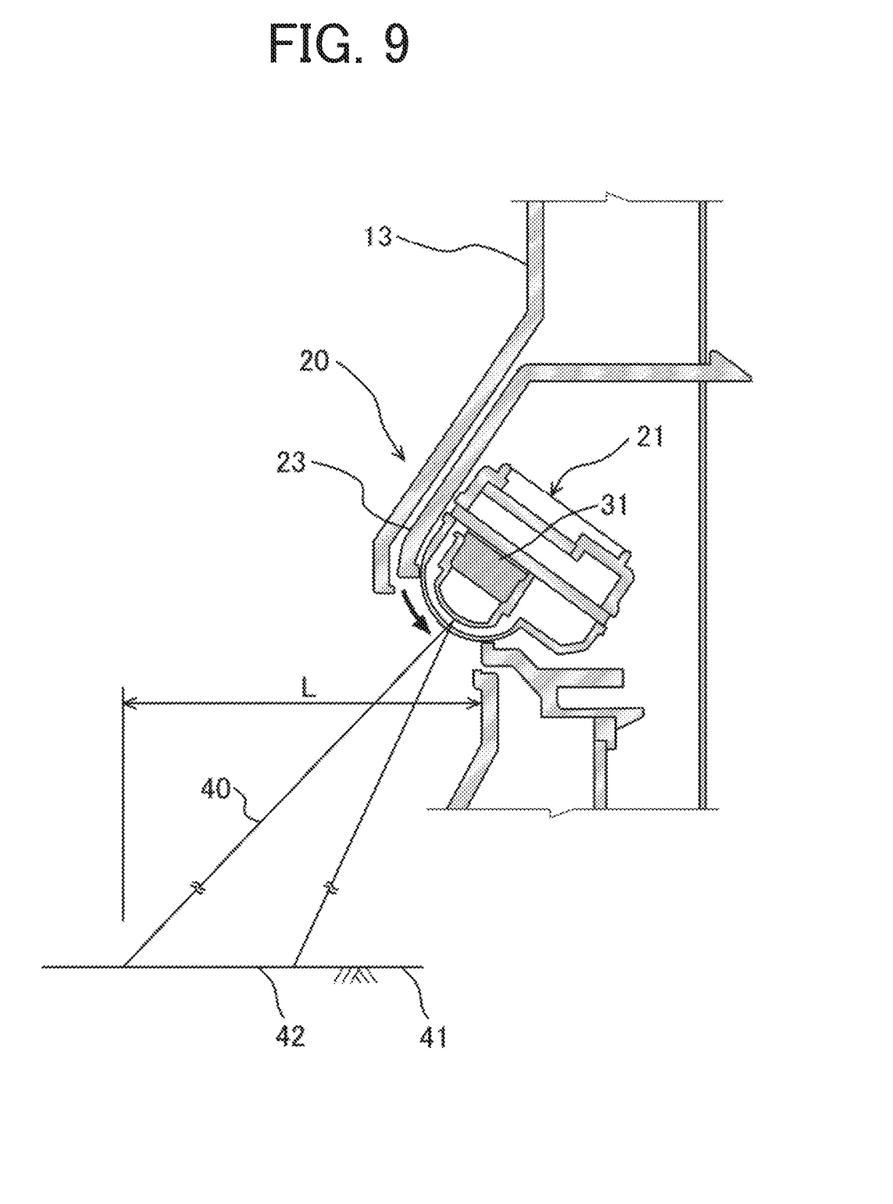
FIG. 9 is a cross-sectional view illustrating the detection range of the pyroelectric sensor of the human detection unit of the image forming apparatus according to the embodiment with the operation lever being operated toward the rear side.

As illustrated in FIGS. 8 and 9, when the operation lever 33 is rotated downward (i.e., toward the rear side), the direction of the optical axis 31c of the pyroelectric sensor 31 becomes closer to the vertical direction. In addition, on the installation surface 41, the areas 42 that are in the light receiving ranges 40 of the pyroelectric sensor 31 become closer to the image forming apparatus 1. In the second state where the operation lever 33 hits the lower edge of the window 23b, the areas 42 are closest, and the distance L is shortest (e.g., 0.7 m).

Effects of Embodiment

In the present embodiment, since the pyroelectric sensor 31 is rotatably mounted to the image forming apparatus main body 2, it is possible to provide the image forming apparatus 1 whose range of detecting a human by using the pyroelectric sensor 31 can be adjusted without adjusting sensitivity of the pyroelectric sensor 31.

Further, in the present embodiment, the pyroelectric sensor 31 is rotatably mounted to the image forming apparatus main body 2 such that the direction of the optical axis 31c of the pyroelectric sensor 31 can be adjusted in the vertical direction. The optical axis 31c of the pyroelectric sensor 31 is adjusted in a specific range directed diagonally forward and downward from the image forming apparatus main body 2. Therefore, it is possible to adjust the detection range of the pyroelectric sensor 31 in the front-rear direction in front of the image forming apparatus main body 2. Furthermore, the range of the direction of the optical axis 31c of the pyroelectric sensor 31, which can be adjusted in the vertical direction, is limited to a specific range directed diagonally forward and downward from the image forming apparatus main body 2. Accordingly, it is possible to prevent the detection range of the pyroelectric sensor 31 from being unintentionally adjusted to an improper range.

In the present embodiment, the human detection unit 20 is disposed in a recess 13b formed on a surface of the front cover 13a of the connection casing 13 of the image forming apparatus 1 projecting forward from the front surface. Therefore, it is possible to reliably detect a person approaching the image forming apparatus 1. Further, the human detection unit 20 does not disturb the operation of the image forming apparatus 1, and unintended changes of the direction of the optical axis 31c of the pyroelectric sensor 31 can be prevented.

Other Embodiments

In the above embodiment, an explanation has been given with a multifunction peripheral as an example of the image forming apparatus 1. However, the image forming apparatus 1 is not limited to a multifunction peripheral, but may be a copier or facsimile, etc.

In the above embodiment, the operation for rotating the pyroelectric sensor 31 is manual. However, the operation for rotating the pyroelectric sensor 31 may be electrically performed by providing the image forming apparatus 1 with a motor, etc.

In the above embodiment, the optical axis 31c of the pyroelectric sensor 31 may be adjusted in a range from the horizontal direction to a specific direction directed forward and downward from the image forming apparatus main body 2. Furthermore, the optical axis 31c of the pyroelectric sensor 31 may be adjusted in the left-right direction.

In the above embodiment, the light receiving path of the pyroelectric sensor 31 is blocked by the attachment plate 34 except for the slit 34c. However, the substrate 35 may not be covered by the attachment plate 34, so that the light receiving path is not blocked in the above way.

As described above, the present disclosure is beneficial for an image forming apparatus that performs human detection by using a pyroelectric sensor.

What is claimed is:
1. An image forming apparatus comprising:
an image forming apparatus main body; and a human detection unit that detects presence of a person based on light received from a periphery of the image forming apparatus main body, wherein the human detection unit includes a sensor unit having a pyroelectric sensor, the sensor unit is supported by a supporting member which is fixed to the image forming apparatus main body, to be rotatable in a predetermined angular range of rotation in order to fix a direction of an optical axis of the pyroelectric sensor in a desired direction within the predetermined angular range of rotation angle, and the sensor unit includes a rotation axis extending in a horizontal direction of the image forming apparatus and being rotatably supported by a support member, an attachment plate provided so as to cover a front-surface side of the sensor unit, an operation lever projecting from the attachment plate to be used by an operator to manually rotate the sensor unit around the rotational axis, and a slit opening formed in a portion of the attachment plate, that faces a detection surface of the pyroelectric sensor, and extending in a direction of the rotation of the sensor unit.

2. The image forming apparatus according to claim 1, wherein the predetermined angular range of rotation is a range from a horizontal direction to a specific direction directed downward, with respect to horizontal direction, and forward, with respect to the image forming apparatus main body.

3. The image forming apparatus according to claim 1, further comprising: a sensor cover that covers the sensor unit and is provided with a window formed at a portion of the sensor cover, facing the pyroelectric sensor.

4. The image forming apparatus according to claim 3, wherein a shape of the window defines an operation range of the operation lever, while the operation range defines the predetermined angular range of rotation.

5. The image forming apparatus according to claim 1, further comprising:

an image reading apparatus, wherein the image forming apparatus main body includes a main body casing and a connection casing that connects the main body casing and the image reading apparatus, and the human detection unit is provided in a recess formed in a front side of the connection casing.

6. The image forming apparatus according to claim 4, wherein the operation lever has a mark formed thereon, the mark indicating a relationship between each position of the operation lever and each corresponding position of the optical axis of the pyroelectric sensor adjusted by the operation lever.

\* \* \* \* \*